(12) United States Patent
Maldoner et al.

(10) Patent No.: US 12,062,872 B2
(45) Date of Patent: Aug. 13, 2024

(54) ADAPTER FOR ELECTRICALLY CONNECTING A LIGHTING DEVICE TO AN ELECTRICAL TRACK

(71) Applicant: Tridonic GmbH & Co KG, Dornbirn (AT)

(72) Inventors: Jakob Maldoner, Stegg (AT); Patrick Marte, Götzis (AT)

(73) Assignee: Tridonic GmbH & Co KG, Dornbirn (AT)

( * ) Notice: Subject to any disclaimer, the term of this patent is extended or adjusted under 35 U.S.C. 154(b) by 378 days.

(21) Appl. No.: 17/633,674

(22) PCT Filed: Aug. 17, 2020

(86) PCT No.: PCT/EP2020/072962
§ 371 (c)(1),
(2) Date: Feb. 8, 2022

(87) PCT Pub. No.: WO2021/037595
PCT Pub. Date: Mar. 4, 2021

(65) Prior Publication Data
US 2022/0316670 A1    Oct. 6, 2022

(30) Foreign Application Priority Data
Aug. 30, 2019 (EP) .................................. 19194588

(51) Int. Cl.
*H01R 13/66* (2006.01)
(52) U.S. Cl.
CPC ................. *H01R 13/665* (2013.01)

(58) Field of Classification Search
CPC ..................................................... H01R 13/665
(Continued)

(56) References Cited

U.S. PATENT DOCUMENTS

| | | | | |
|---|---|---|---|---|
| 6,042,399 A | * | 3/2000 | Jaakkola | H01R 25/142 439/122 |
| 6,491,410 B2 | * | 12/2002 | Ladstatter | F21S 4/20 362/147 |

(Continued)

FOREIGN PATENT DOCUMENTS

| | | |
|---|---|---|
| CN | 203827549 | 9/2014 |
| CN | 107124033 | 9/2017 |

(Continued)

OTHER PUBLICATIONS

PCT/EP2020/072962, International Search Report and Written Opinion dated Oct. 27, 2020, 10 pages.

*Primary Examiner* — Gary F Paumen
(74) *Attorney, Agent, or Firm* — Andrus Intellectual Property Law, LLP (57) ABSTRACT

The invention relates to an adaptor for electrically connecting a lighting apparatus to an electrified track, wherein the electrified track comprises AC main phases L1, L2 and L3 and a neutral wire N, wherein the adaptor has a housing designed to be inserted into a U-shaped profile of the electrified track, wherein the adaptor has contacts for contacting the AC main phases L1, L2 and L3 and the neutral wire N of the electrified track, wherein the adaptor comprises an electronic control unit in the housing, wherein the control unit is configured to select a combination of one of the all connected AC main phases L1, L2, L3 with the neutral wire N for supplying the lighting apparatus.

16 Claims, 6 Drawing Sheets

(58) Field of Classification Search
USPC .......................................................... 439/121
See application file for complete search history.

(56) References Cited

U.S. PATENT DOCUMENTS

| | | | | |
|---|---|---|---|---|
| 8,888,512 | B2* | 11/2014 | Hoffmeister | H01R 25/142 |
| | | | | 439/121 |
| 9,242,894 | B2* | 1/2016 | Min | C03C 17/34 |
| 2002/0003702 | A1 | 1/2002 | Ladstatter et al. | |
| 2014/0134856 | A1* | 5/2014 | Hoffmeister | H01R 25/142 |
| | | | | 439/119 |
| 2015/0079824 | A1* | 3/2015 | Dinnebier | H01R 13/44 |
| | | | | 439/121 |
| 2015/0084420 | A1 | 3/2015 | Dickerson et al. | |

FOREIGN PATENT DOCUMENTS

| | | |
|---|---|---|
| DE | 4127899 | 2/1993 |
| EP | 0486714 | 5/1992 |
| EP | 3217090 | 12/2018 |

\* cited by examiner

ADAPTER FOR ELECTRICALLY CONNECTING A LIGHTING DEVICE TO AN ELECTRICAL TRACK

CROSS REFERENCE TO RELATED APPLICATIONS

The present application is the U.S. national stage application of international application PCT/EP2020/072962 filed Aug. 17, 2020, which international application was published on Mar. 4, 2021 as International Publication WO 2021/037595 A1. The international application claims priority to European Patent Application 19194588.0 filed Aug. 30, 2019.

FIELD OF THE INVENTION

The invention relates to an adaptor for electrically connecting a lighting apparatus to an electrified track. The invention further relates to a system comprising an electrified track and an adaptor.

BACKGROUND OF THE INVENTION

EP3217090A1 proposes a lighting system comprising an electrical track having three mains phases and an adapter for electrically connecting a lighting device to the electrical track, such that the lighting device may receive power from the mains. The adapter supports the lighting device, for example a spotlight. The electrical track may hold several adapters, hence several lighting devices, which are for example arranged in a row. In order to enable an operator to adjust the number and locations of the adapters on the electrical track, the adapter includes a mechanism configured for extracting contacts automatically when the adapter is fitted in the electrical track, such that the contacts are electrically connected to the three mains phases.

However, the known adapter presents some drawbacks and limitations. First, it has a relatively complex structure and it requires numerous components, thus increasing the cost and footprint of the lighting system. Also, the automatic connection of the contacts to the three mains phases limits the flexibility in the electrical connection possibilities.

Thus, it is an objective to provide for an improved adaptor for electrically connecting a lighting apparatus to an electrified track.

SUMMARY OF THE INVENTION

The object of the present invention is achieved by the solution provided in the enclosed independent claims. Advantageous implementations of the present invention are further defined in the dependent claims.

According to a first aspect of the invention, an adaptor for electrically connecting a lighting apparatus to an electrified track is provided. The electrified track comprises AC main phases L1, L2 and L3 and a neutral wire N, the adaptor has a housing designed to be inserted into a U-shaped profile of the electrified track, the adaptor has contacts for contacting the AC main phases L1, L2 and L3 and the neutral wire N of the electrified track, the adaptor comprises an electronic control unit in the housing, and the control unit is configured to select a combination of one of the all connected AC main phases L1, L2, L3 with the neutral wire N for supplying the lighting apparatus.

This provides the advantage that the selection of combination of L and N wires for supplying for example a connected LED-load is no longer done mechanically, but electronically inside the adapter.

In an embodiment, the adaptor comprises terminals in order to supply the lighting apparatus, such as a LED module.

This provides the advantage that the LED module can efficiently be supplied with power, due to the fact that the selection of combination of L and N wires for supplying for example a connected LED-load is no longer done mechanically, but electronically inside the adapter.

In a further embodiment, the control unit is configured to contact one of the possible combinations L1/N, L2/N and L3/N.

This provides the advantage that, the electrical phase selection switch can respond to a power failure of one phase and automatically switch to another phase non-affected by power failure.

In a further embodiment, the adaptor is inserted into the electrified track in two different orientations.

This provides the advantage that the insertion of the adaptor into the electrified track can be performed in a more flexible and easy way.

In a further embodiment, the two different orientations are rotated by 180 degrees.

In a further embodiment, when inserting the adaptor, all phases L1, L2 and L3 and the neutral wire N of the electrified track are contacted.

This provides the advantage that in case of power failure of one of the phases another one can be used.

In a further embodiment, the electrified track has a cross-sectional shape of U.

In a further embodiment, the adaptor comprises LED-driver electronics and is inserted preferably flush with the U-shaped profile of the electrified track.

In a further embodiment, the control unit is configured to selectively contact a combination of one of L1, L2, L3 with N electronically inside the adaptor to output terminals, wherein the output terminals are fed to an AC input of the LED-driver electronics.

In a further embodiment, the adaptor further comprises a selection network for selecting the L1, L2, L2 and N wire, wherein the selection network comprises a plurality of controllable high voltage semi-conductor switches, such as triacs or high voltage transistors.

This provides the advantage that the selection of the wires can be done in an easy way by using well known electrical components, such as triacs or transistors.

In a further embodiment, the control unit is further configured to select L1, L2, L2 and N wire based on a rectifying diode network.

This provides the advantage that the selection of the wires can be done in an easy way by using well known electrical components, such as diodes.

In a further embodiment, the adaptor further comprises a housing such that the adaptor can only be inserted in one predetermined orientation in the electrified track.

In a further embodiment, the control unit is connected with an interface.

This provides the advantage that the phase has no longer to be set manually.

In a further embodiment, the interface is a wireless interface such as an NFC interface or a wired interface such as a DALI bus interface.

This provides the advantage that the phase has no longer to be set manually, but can also be adjusted, for example via DALI bus interface.

In a further embodiment, the interface comprises mechanical means on the adaptor itself.

According to a second aspect, the invention relates to a system comprising an electrified track comprising AC main phases L1, L2 and L3 and a neutral wire N, and an adaptor according to the first aspect or any one of the implementation forms thereof.

BRIEF DESCRIPTION OF THE DRAWINGS

The invention will be explained in the followings together with the figures.

DETAILED DESCRIPTION

Aspects of the present invention are described herein in the context of an adaptor for electrically connecting a lighting apparatus to an electrified track.

The present invention is described more fully hereinafter with reference to the accompanying drawings, in which various aspects of the present invention are shown. This invention however may be embodied in many different forms and should not be construed as limited to the various aspects of the present invention presented through this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

Various aspects of an adaptor for electrically connecting a lighting apparatus to an electrified track will be presented.

However, as those skilled in the art will readily appreciate, these aspects may be extended to aspects of adaptors for electrically connecting a lighting apparatus to an electrified track without departing from the invention.

It is further understood that the aspect of the present invention might contain integrated circuits that are readily manufacturable using conventional semiconductor technologies, such as complementary metal-oxide semiconductor technology, short "CMOS". In addition, the aspects of the present invention may be implemented with other manufacturing processes for making optical as well as electrical devices. Reference will now be made in detail to implementations of the exemplary aspects as illustrated in the accompanying drawings. The same references signs will be used throughout the drawings and the following detailed descriptions to refer to the same or like parts.

Figure 1:
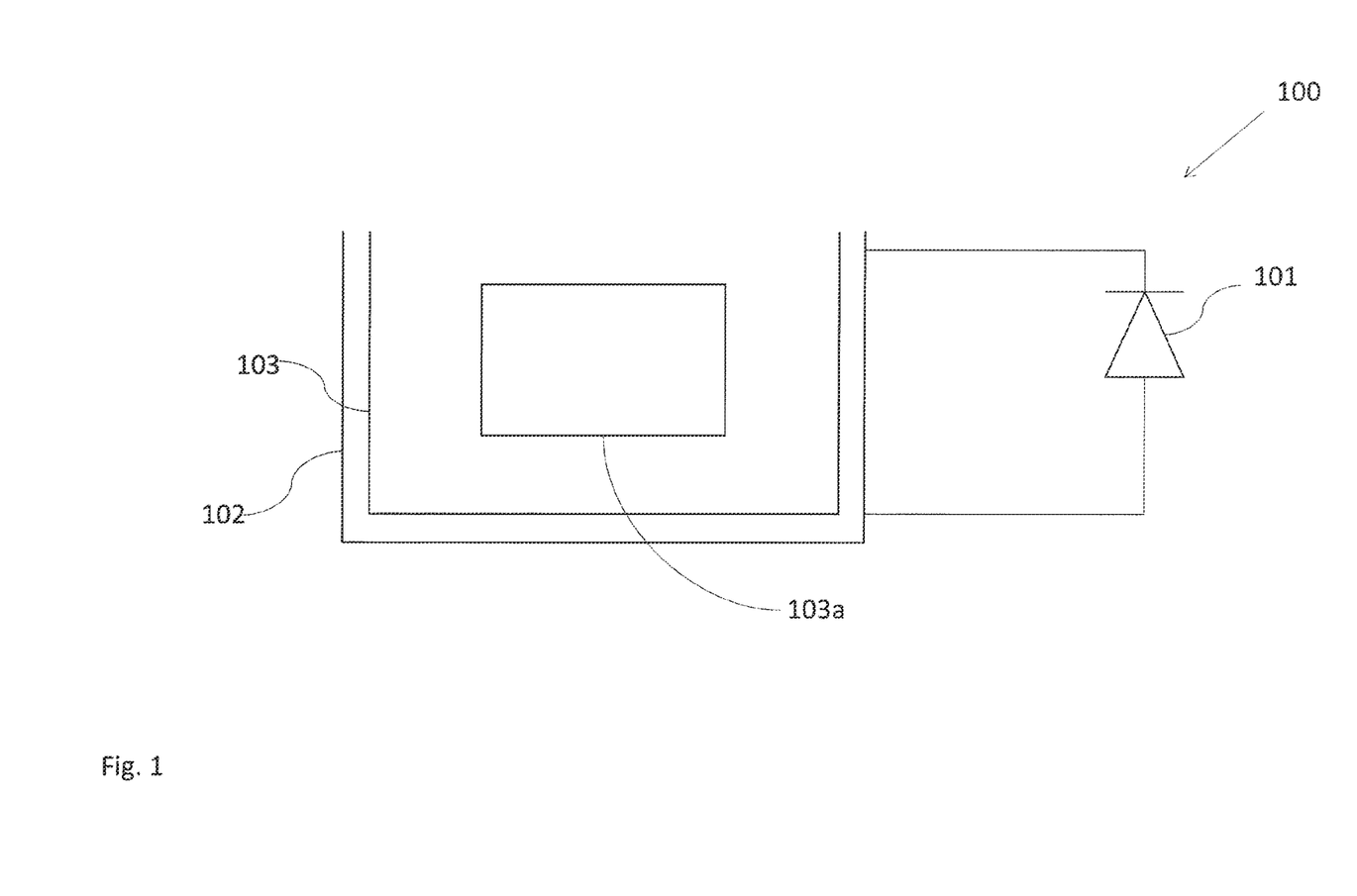
FIG. 1 shows a system comprising an adaptor for electrically connecting a lighting apparatus to an electrified track according to an embodiment.

Now referring to FIG. 1, FIG. 1 shows a system 100 comprising an adaptor 103 for electrically connecting a lighting apparatus 101 to an electrified track 102 according to an embodiment.

The electrified track 102 comprises AC main phases L1, L2 and L3 and a neutral wire N. The adaptor 103 has a housing designed to be inserted into a U-shaped profile of the electrified track 102, wherein the adaptor 103 has contacts for contacting the AC main phases L1, L2 and L3 and the neutral wire N of the electrified track 102.

Moreover, the adaptor 103 comprises an electronic control unit 103a in the housing, wherein the control unit 103a is configured to select a combination of one of the all connected AC main phases L1, L2, L3 with the neutral wire N for supplying the lighting apparatus 101.

Figure 2:
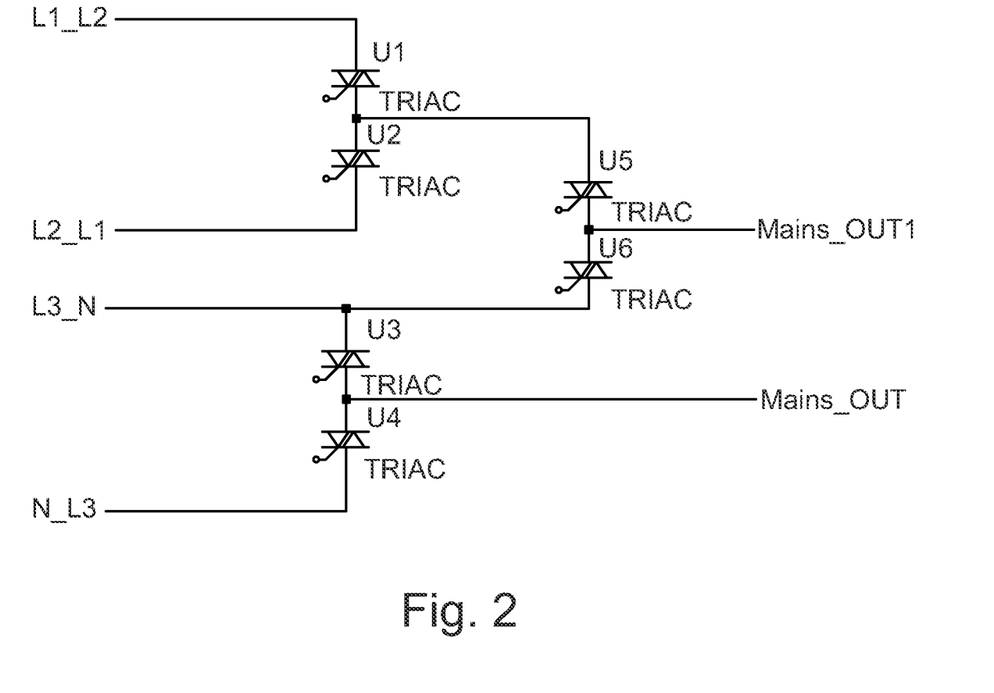
FIG. 2 shows a selection network for an adaptor for electrically connecting a lighting apparatus to an electrified track according to an embodiment.

FIG. 2 shows a selection network for an adaptor 103 for electrically connecting a lighting apparatus 101 to the electrified track 102 according to an embodiment.

In the circuitry shown in FIG. 2, a situation is shown in which the adapter 103 can be inserted into the electrified track 102 in two different orientations (rotated by 180 degree), such that, depending on the insertion orientation of the adapter 103, different contacts can actually be contacted to the contacts of the adapter 103.

According to an embodiment, when inserting the adapter 103, all phases L1, L2, L3 and N of the electrified track 102 are contacted.

A low-power voltage supply is provided such that already in this state (in which no phase is connected to the output), a control circuitry or electronic control unit 103a, such as for example a micro-controller of the driver is powered. The control circuitry 103a then detects the insertion orientation of the adapter by sensing at which contacts actually voltage is present.

Furthermore, the control circuitry 103a is supplied in a wireless or in a wired manner with the instructions as which of the L1, L2 and L3 shall be switched active in combination with the N wire.

To this regard, a selection network is provided which comprises a plurality of controllable high voltage semiconductor switches, such as triacs U1, U2, U3, U4, U5 and U6 or high voltage transistors.

Depending on the selection, information is supplied to the controlled circuitry or electronic control unit 103a, and correspondingly the control circuitry or electronic control unit 103a controls the semi-conductor switches such that the desired phase L1, L2, L3 is switched active in combination with the N wire.

Figure 3:
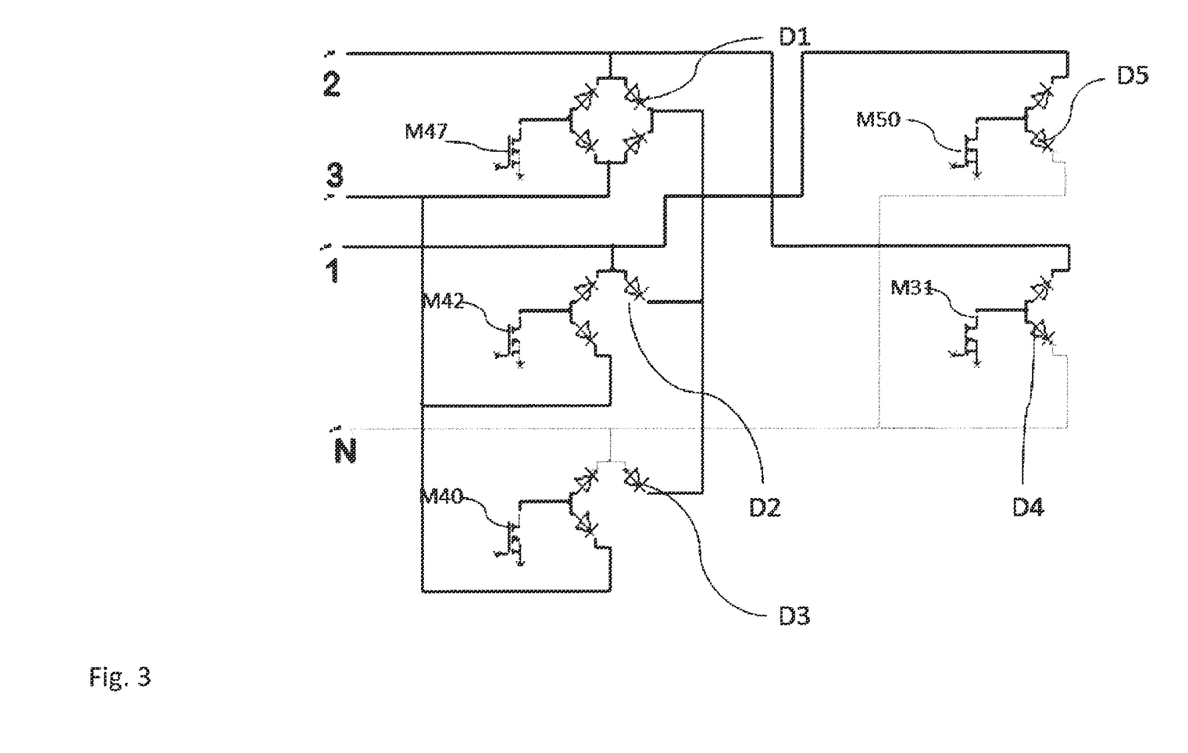
FIG. 3 shows a selection network for an adaptor for electrically connecting a lighting apparatus to an electrified track according to an embodiment.

FIG. 3 shows a selection network for the adaptor 103 for electrically connecting the lighting apparatus 101 to the electrified track 102 according to an embodiment.

In the embodiment shown in FIG. 3, the selection of the phases L1, L2, L3 and N wire is integrated in a rectifying diode network D1, D2, D3, D4 and D5. Semi-conductors which are M47, M42, M40, M31 and M50 are provided, which can selectively connect a mid-point of the rectifier network with the ground potential of the driver.

Only the phases L1, L2, L3 or N are switched active where the semi-conductor switch is made to provide for a conducting contact between the mid-point of the rectifier network with the ground potential.

Figure 4:
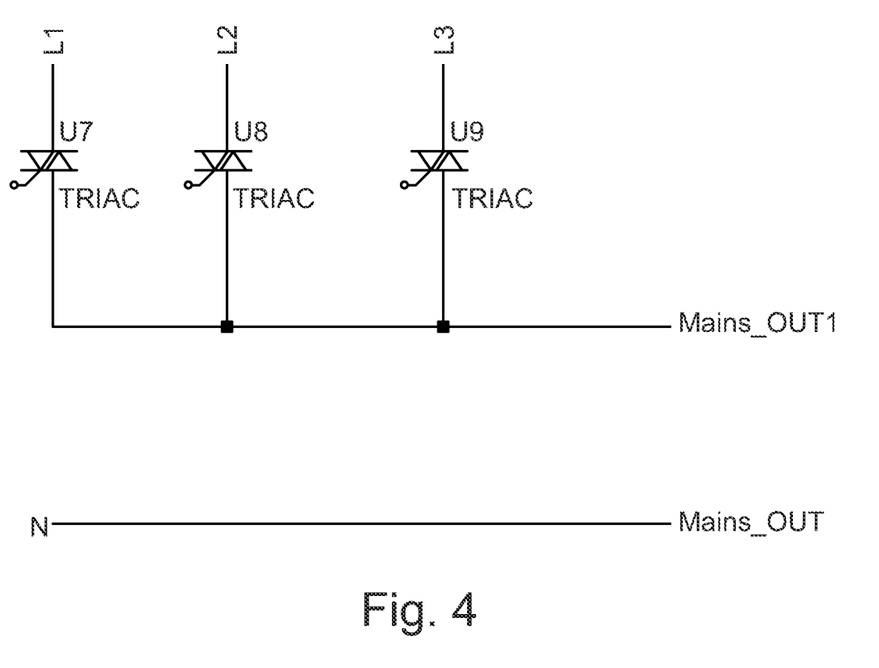
FIG. 4 shows a selection network for an adaptor for electrically connecting a lighting apparatus to an electrified track according to an embodiment.

FIG. 4 shows a selection network for the adaptor 103 for electrically connecting the lighting apparatus 101 to the electrified track 102 according to an embodiment.

The embodiment shown in FIG. 3 is a simplified selection network with 3 semiconductor switches U7, U8, U9 which may be triacs, provided upfront the converter electronics.

According to this implementation, it is foreseen that mechanical measures are integrated in the housing of the adapter 103 such that the adapter 103 can only be inserted in one defined orientation in the electrified track 102, the selection network can be simplified.

Figure 5:
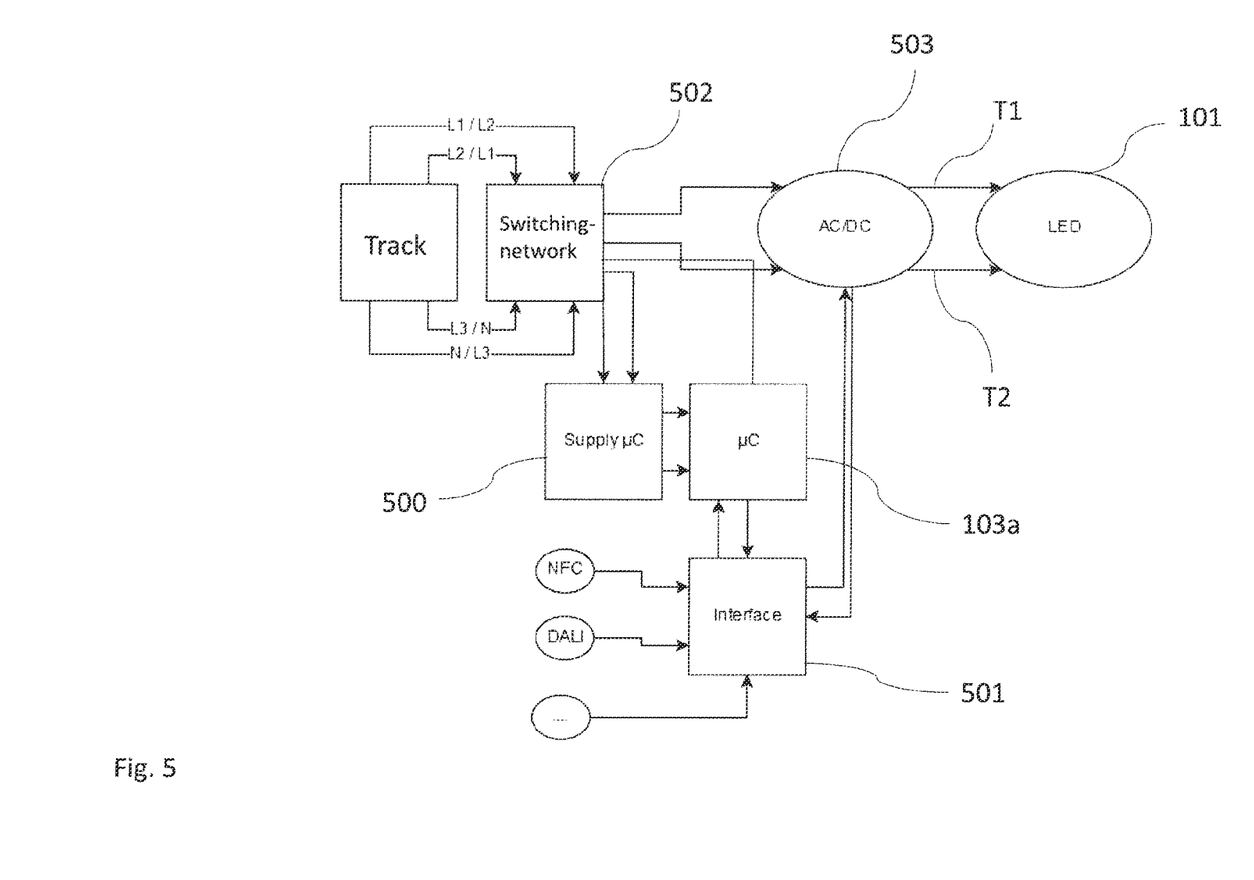
FIG. 5 shows electronics in an adaptor for electrically connecting a lighting apparatus to an electrified track according to an embodiment.

FIG. 5 shows electronics in the adaptor 103 for electrically connecting a lighting apparatus 101 to an electrified track 102 according to an embodiment.

FIG. 5 shows generally the electronics in the adapter according to an embodiment together with the terminals T1, T2 for feeding an LED-load 101 starting from the AC/DC converter.

The supply micro-controller block 500 is the low-voltage power supply for the micro-controller 103a.

The switching network 502 is controlled by a digital logic. This can e.g. be executed as µC 103a. The supply for the µC 103a can be done directly from the grid.

As it can be taken from FIG. 5, the micro-controller 103a can be in functional connection with an interface 501, such that for example phase selection instructions can be provided wirelessly (NFC), in a wired manner (DALI-bus, etc.) or also by mechanical means on the adapter 103 itself.

According to an embodiment, the micro-controller 103a senses the AC-voltage present at the different phases L1, L2, L3 and N (in order to detect the orientation). This AC voltage detection can also be used for an in-rush limiting switching on, which means that the micro-controller µC 103 switches active (conducting) the semi-conductor switch at a point in time, which is close to the zero-crossing of the AC sign wave.

According to an embodiment, in µC 103a, temporal sequences are stored, in which the electrical phase selection switch automatically changes the phase (working day/weekday).

According to another embodiment, the electrical phase selection switch completely turns off the AC/DC part to minimize the standby losses.

Figure 6:
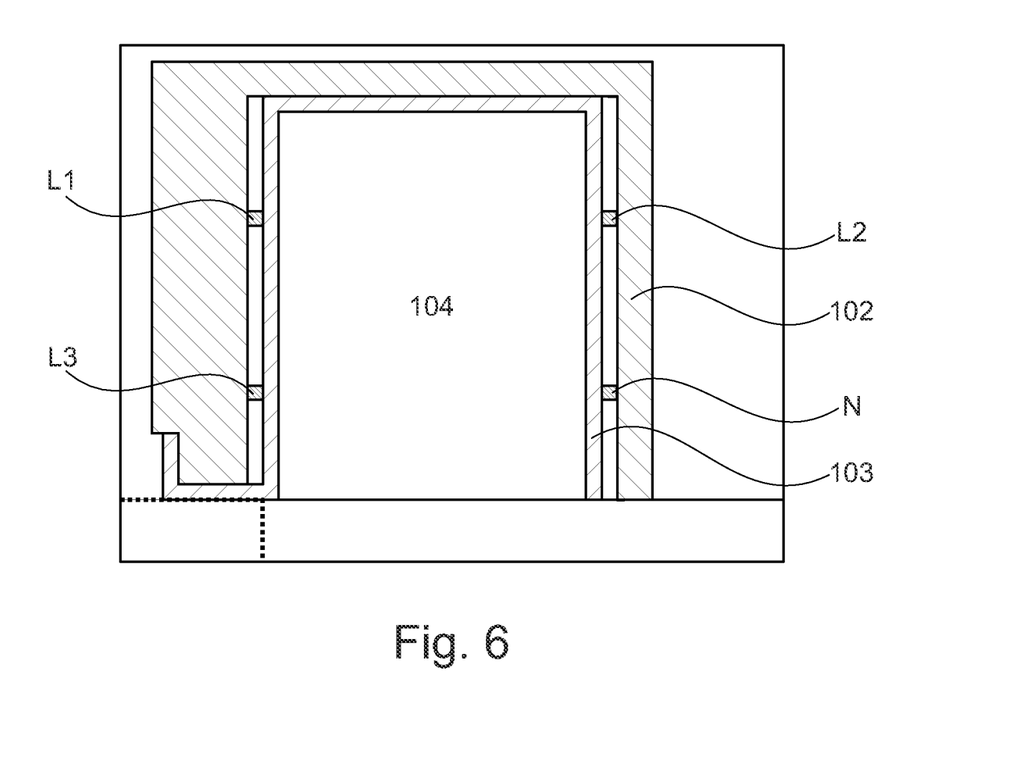
FIG. 6 shows a cross sectional view of an electrified track according to an embodiment.

FIG. 6 shows a cross sectional view of an electrified track 102 according to an embodiment.

The tracks typically have essentially the cross-sectional shape of a "U".

In one embodiment, the adapter 103 with integrated LED-driver electronics is inserted to be essentially flush with the U-shaped profile of the electrified track 102. The electrified track 102 carries four conductors, which are the AC main phases L1, L2, L3 as well as the neutral wire N.

The adapter 103 is designed to selectively contact a combination of one of L1, L2, L3 with N. Thus, a simple addressing is possible when only a subset, preferably one of the phases L1, L2, L3 is switched in order to modify the electrical power sent to the adapter 103, which is actively connected to the corresponding phase L1, L2 or L3.

In one embodiment, the selection of the combinations of L and N wires for supplying a connected LED-load 101 is no longer done mechanically, but electronically inside the adaptor.

The adapter mechanically contacts all electrical connections, L1, L2, L3 and N provided in the electrified track 102. These mechanical connections are then internally selectively connected.

This selection is made internally by the control unit 103a in the adapter 103 selectively connecting N and L1, L2, L3 contacts to the output terminals OUT, OUT 1 (see FIG. 2), which are then fed to the AC input of the driver electronics which is preferably also provided within the adapter 103.

The electrical track 102 may be made of an electrically insulating material. The electrical track 102 may separately hold three electrically conducting wires or lines, which are independently connected to the respective mains phases L1, L2 and L3. The electrical track 102 may further hold an electrically conducting wire N, which is connected to the neutral or ground and which is symbolized in FIG. 6.

Besides, the electrical track 102 may define a chamber 104 for receiving the adapter 103. The adapter 103 may be completely inserted into the chamber 104 as visible in FIG. 6.

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence.

Although the invention has been illustrated and described with respect to one or more implementations, equivalent alternations and modifications will occur to those skilled in the art upon the reading of the understanding of the specification and the annexed drawings. In addition, while a particular feature of the invention may have been disclosed with respect to only of the several implementations, such features may be combined with one or more other features of the other implementations as may be desired and advantage for any given or particular application.

What is claimed is:

1. An adaptor (103) for electrically connecting a lighting apparatus (101) to an electrified track (102), wherein
the electrified track (102) comprises AC main phases L1, L2 and L3 and a neutral wire N, wherein the adaptor (103) has a housing designed to be inserted into a U-shaped profile of the electrified track (102), wherein
the adaptor (103) has contacts for contacting the AC main phases L1, L2 and L3 and the neutral wire N of the electrified track (102), wherein
the adaptor (103) comprises an electronic control unit (103a) in the housing, wherein
the control unit (103a) is configured to select a combination of one of the all connected AC main phases L1, L2, L3 with the neutral wire N for supplying the lighting apparatus (101).

2. The adaptor (103) of claim 1, wherein the adaptor (103) comprises terminals in order to supply the lighting apparatus (101), such as a LED module.

3. The adaptor (103) of claim 1, wherein the control unit (103a) is configured to contact one of the possible combinations L1/N, L2/N and L3/N.

4. The adaptor (103) of claim 1, wherein the adaptor (103) is inserted into the electrified track (102) in two different orientations.

5. The adaptor (103) of claim 4, wherein the two different orientations are rotated by 180 degrees.

6. The adaptor (103) of claim 5, wherein, when inserting the adaptor (103), all phases L1, L2 and L3 and the neutral wire N of the electrified track (102) are contacted.

7. The adaptor (103) of claim 1, wherein the electrified track (102) has a cross-sectional shape of U.

8. The adaptor (103) of claim 7, wherein the adaptor (103) comprises LED-driver electronics and is inserted preferably flush with the U-shaped profile of the electrified track (102).

9. The adaptor (103) of claim 1, wherein the control unit (103a) is configured to selectively contact a combination of one of L1, L2, L3 with N electronically inside the adaptor (103) to output terminals, wherein the output terminals are fed to an AC input of the LED-driver electronics.

10. The adaptor (103) of claim 1, wherein the adaptor (103) further comprises a selection network for selecting the L1, L2, L2 and N wire, wherein the selection network comprises a plurality of controllable electronic switches, such as triacs or high voltage transistors.

11. The adaptor (103) of claim 1, wherein the control unit (103a) is further configured to select L1, L2, L2 and N wire based on a rectifying diode network.

12. The adaptor (103) of claim 1, wherein the adaptor (103) further comprises a housing such that the adaptor (103) can only be inserted in one predetermined orientation in the electrified track (102).

13. The adaptor (103) of claim 1, wherein the control unit (103a) is connected with an interface (501).

14. The adaptor (103) of claim 13, wherein the interface (501) is a wireless interface such as an NFC interface or a wired interface such as a DALI bus interface.

15. The adaptor (103) of claim 13, wherein the interface (501) comprises mechanical means on the adaptor (103) itself.

16. A system (100) comprising an electrified track (102) comprising AC main phases L1, L2 and L3 and a neutral wire N, and an adaptor (103) according to claim 1.

* * * * *